United States Patent [19]

Rabeony et al.

[11] Patent Number: 5,841,010
[45] Date of Patent: Nov. 24, 1998

[54] SURFACE ACTIVE AGENTS AS GAS HYDRATE INHIBITORS

[75] Inventors: Manese Rabeony, Piscataway; Dennis George Peiffer, Annanda le, both of N.J.; Christine Ann Costello; Pamela Jean Wright, both of Easton, Pa.; Karla Schall Colle, Houston; Larry Dalton Talley, Friendswood, both of Tex.

[73] Assignee: Exxon Production Research Company, Houston, Tex.

[21] Appl. No.: 459,643

[22] Filed: Jun. 2, 1995

Related U.S. Application Data

[62] Division of Ser. No. 306,350, Sep. 15, 1994, abandoned.

[51] Int. Cl.⁶ .................. C07C 7/20; F17D 1/05
[52] U.S. Cl. .................. 585/3; 585/2; 585/4; 585/15; 585/950; 95/153
[58] Field of Search .................. 585/15, 950, 2, 585/3, 4; 95/153

[56] References Cited

U.S. PATENT DOCUMENTS

| | | | |
|---|---|---|---|
| 4,456,067 | 6/1984 | Pinner, Jr. | 166/279 |
| 4,856,589 | 8/1989 | Kuhlman et al. | 166/273 |
| 4,856,593 | 8/1989 | Matthews et al. | 166/310 |
| 4,915,176 | 4/1990 | Sugier et al. | 166/371 |
| 4,973,775 | 11/1990 | Sugier et al. | 585/15 |
| 5,076,364 | 12/1991 | Hale et al. | 166/310 |
| 5,244,878 | 9/1993 | Sugier et al. | 507/90 |

FOREIGN PATENT DOCUMENTS

| | | |
|---|---|---|
| 2101799 | 2/1994 | Canada . |
| 0309210 | 3/1989 | European Pat. Off. . |
| 0 457375A | 11/1991 | European Pat. Off. . |
| 582507 | 2/1994 | European Pat. Off. . |
| 2 618876 | 2/1989 | France . |
| 1 79928 | 2/1993 | Russian Federation . |
| 1 799286 | 2/1993 | Russian Federation . |
| 1391692 | 4/1988 | U.S.S.R. . |
| WO9325798 | 12/1993 | WIPO . |

OTHER PUBLICATIONS

"Effect of Surfactants on Hydrate Formation Kinetics," Kalogerakis et al. SPE 1993 International Oilfield Chem Symposium (New Orleans, 3/2–5/93) Proceedings 375–83 (1993).

"Surfactants in Oil Production," Muijs, R. Soc. Chem., (Chemical Oil Ind. Developments & Applications) V 97, 277–97, 1991. (No Month).

"A Molecular Mechanism for Gas Hydrate Nucleation from Ice," Sloan, et al, AIChE Journal, V37, N.9, 1281–92, (Sep. 1991).

"Surfactants Studied as Hydrate–Formation Inhibitors," Kuliev et al, Gazovoe Delo (1972), (10), 17–19.. (Translation enclosed). (No Month).

"Effect of Lower Alcohols on Formation of Crystallohydrates of Liquids and Gases,"Krasnov, Gazovoe Delo (1966), (12), 9–11 (Translation enclosed). (No Month).

"Clathrate Hydrates," P. Englezos, Ind. Eng. Chem. RES. 1993, 32, 1251–1274. (No Month).

"Recent Developments in Gas Dehydration and Hydrate Inhibition," Hubbard, et al, SPE 21507, pp. 263–276 (1991). (No Month).

"Natural Gas Hydrate Phase Equilibria and Kinetics: Understanding the State of the Art,"Sloan, Revue De L'Institut Francais Du Petrole, vol. 45, No. 2, MARS–AVRIL 1990. (No Month).

*Primary Examiner*—Walter D. Griffin
*Attorney, Agent, or Firm*—Estelle C. Bakun

[57] ABSTRACT

This invention is directed toward a method for inhibiting the formation (nucleation, growth and agglomeration) of clathrate hydrates. The method comprises adding into a mixture comprising hydrate forming substituents and water, an effective amount of a hydrate inhibitor selected from the group consisting of anionic, cationic, non-ionic and zwitterionic hydrate inhibitors. The hydrate inhibitor has a polar head group and a nonpolar tail group not exceeding 12 carbon atoms in the longest carbon chain.

2 Claims, 1 Drawing Sheet

SURFACE ACTIVE AGENTS AS GAS HYDRATE INHIBITORS

This is a division of application Ser. No. 306,350, filed Sep. 15, 1994, now abandoned.

FIELD OF THE INVENTION

The invention is a method for inhibiting the formation growth and agglomeration of clathrate hydrates, also referred to as gas hydrates, in natural gas, petroleum gas or other gases.

BACKGROUND OF THE INVENTION

Carbon dioxide, hydrogen sulfide and various hydrocarbons, such as methane, ethane, propane, normal butane and isobutane, are present in natural gas and other petroleum fluids. However, water is typically found mixed in varying amounts with such petroleum fluids constituents. Under conditions of elevated pressure and reduced temperature clathrate hydrates can form when such petroleum fluids constituents or other hydrate formers are mixed with water. Clathrate hydrates are water crystals which form a cage-like structure around guest molecules such as hydrate forming hydrocarbons or gases. Some hydrate forming hydrocarbons include, but are not limited to, methane, ethane, propane, isobutane, butane, neopentane, ethylene, propylene, isobutylene, cyclopropane, cyclobutane, cyclopentane, cyclohexane and benzene. Some hydrate forming gases include but are not limited to oxygen, nitrogen, hydrogen sulfide, carbon dioxide, sulfur dioxide and chlorine.

Gas hydrate crystals or gas hydrates are a class of clathrate hydrates of particular interest to the petroleum industry because of the pipeline blockages that they can produce during the production and transport of natural gas and other petroleum fluids. For example, ethane, at a pressure of about 1 MPa, can form gas hydrates with water at temperatures below 4° C., while at a pressure of 3 MPa it can form gas hydrates with water at temperatures below 14° C. Such temperatures and pressures are not uncommon for many operating environments where natural gas and other petroleum fluids are produced and transported.

As gas hydrates agglomerate they can produce hydrate blockages in the pipe or conduit used to produce and/or transport natural gas or other petroleum fluid. The formation of such hydrate blockages can lead to a shutdown in production and thus substantial financial losses. Furthermore, restarting a shutdown facility, particularly an offshore production or transport facility, is difficult because significant amounts of time, energy, and materials, as well as various engineering adjustments, are required to remove the hydrate blockage.

A variety of measures have been used by the oil and gas industry to prevent the formation of hydrate blockages in oil or gas streams. Such measures include removing free water, reducing the water content of the hydrocarbon phase, maintaining the temperatures and/or pressure outside hydrate formation conditions and introducing an antifreeze such as methanol, ethanol, propanol or ethylene glycol. However, the amount of antifreeze required to prevent hydrate blockages is typically between 10% to 20% by weight of the water present in the oil or gas stream. Consequently, several thousand gallons per day of such solvents are usually required. Such quantities present handling, storage, recovery and potential toxicity issues. Moreover, these solvents are difficult to completely recover from the production or transportation stream. From an engineering standpoint, maintaining temperature and/or pressure outside hydrate formation conditions requires design and equipment modifications, such as insulated or jacketed piping. Such modifications are costly to implement and maintain. Furthermore, complex and difficult procedures must be used to ensure that the hydrate blockage is melted safely.

Consequently, there is a need for a gas hydrate inhibitor that can be conveniently stored, handled and dissolved in the water phase associated with the produced or transported petroleum fluids. Such an inhibitor would prevent hydrate blockages by inhibiting the formation, growth, and/or agglomeration of gas hydrate crystals in an oil or gas stream.

SUMMARY OF THE INVENTION

This invention is directed toward a method for inhibiting the formation (nucleation, growth and agglomeration) of clathrate hydrates comprising:

adding into a mixture comprising hydrate forming substituents and water, an effective amount of a surface active hydrate inhibitor selected from the group consisting of anionic, cationic, non-ionic and zwitterionic hydrate inhibitors, and wherein said hydrate inhibitor has a polar head group and a nonpolar tail group selected from the group consisting of alkyl, alkenyl and alkynyl groups, said nonpolar tail group not exceeding 12 carbon atoms in the longest carbon chain and wherein said tail group is directly bonded to said head group.

This invention is further directed to a composition of matter comprising a mixture of hydrate forming constituents, water and a hydrate inhibitor wherein said hydrate inhibitor is selected from the group consisting of anionic, cationic, non-ionic and zwitterionic inhibitors and wherein said hydrate inhibitor has nonpolar tail group selected from the group consisting of alkyl, alkenyl and alkynyl groups, said nonpolar tail group not exceeding 12 carbon atoms in the longest carbon chain and a polar head group, and wherein said tail group is directly bonded to said head group.

The invention is further directed to the adduction of ethylene oxide to the alkyl, alkynyl and alkenyl chain of said nonpolar tail group of said hydrate inhibitor.

DETAILED DESCRIPTION OF THE INVENTION

Figure 1:
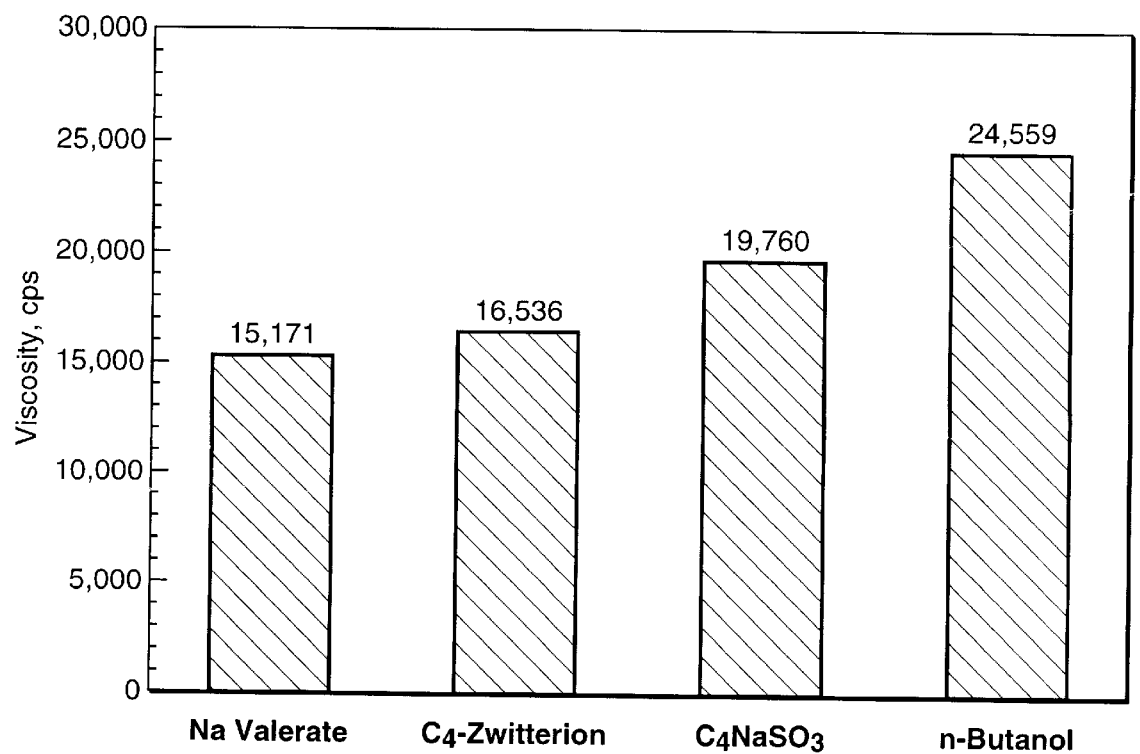
FIG. 1 is a graphical representation of the viscosities of tetrahydrofuran hydrates at 0° C. following addition of the noted hydrate inhibitors.

The invention inhibits the formation of hydrates in a fluid having hydrate forming constituents. Formation of hydrates means the nucleation, growth, and/or agglomeration of hydrates. Such hydrates may be formed in a fluid whether it is flowing or substantially stationary, but are often most problematic in flowing fluid streams conveyed in a pipe. For example, flow restrictions arising from partial or complete blockages in a fluid stream can arise as hydrates adhere to and accumulate along the inside wall of the pipe used to convey the fluid. Nonetheless, the invention can be used for inhibiting formation of hydrates in substantially stationary fluids.

The hydrate inhibitors of this invention have anionic, cationic, non-ionic and zwitterionic polar head groups, and a nonpolar tail group selected from the group consisting of alkyl, alkynyl and alkenyl groups. Preferably alkyl tail groups will be used. The alkyl group of the tail may be normal alkyl, branched alkyl or cyclic alkyl. Preferably, the alkyl group will be a normal or branched alkyl group, most preferably a normal alkyl group. The longest carbon chain length of the tail will range from 2 to 12, preferably 2 to 8 carbons in length. However, if an alcohol (including diols) is selected as the inhibitor, the longest carbon chain length of the tail group will preferably range from $C_4$ to $C_{12}$, more preferably $C_4$ to $C_8$, and most preferably $C_4$. Examples of suitable hydrate inhibitors are sodium valerate, n-butanol, $C_4$–$C_8$ zwitterion, (zwitterionic head group with $C_4$–$C_8$ tail group), 1-butanesulfonic acid Na salt, butanesulfate Na salt, alkylpyrrolidones and mixtures thereof, with butanesulfate Na salt being preferred. The tail group chain length may vary within the specified range depending on the head group selected. All of the above surfactants are commercially available or readily synthesized by literature methods. The head and tail groups discussed herein are also commonly referred to as hydrophilic and lipophilic groups, respectively. Furthermore, the head group defines the type of inhibitor, e.g., an inhibitor with a zwitterionic head group would be a zwitterionic inhibitor.

The inhibitors utilized in the instant invention have their alkyl tail groups directly bonded to the cationic, nonionic, zwitterionic or anionic head group. This means that the first carbon atom of the tail group in the longest carbon chain is directly bonded to the head group. Hence, there are no intervening functional groups between the head and tail group such as ester or aryl groups which would be present in compounds such as alkylarylsulfates and dioctylsulfosuccinate Na salt having an intervening aryl and ester group, respectively. Such intervening groups are often referred to as connector groups. No such groups are present in the instant surface active agents which are gas hydrate inhibitors. Thus, the head and tail groups of the instant inhibitors are directly attached or directly adjacent to each other.

The surface active agent or hydrate inhibitor is introduced into the mixture comprising hydrate forming constituents using mechanical equipment, such as, chemical injection pumps, piping tees, injection fittings, and other devices which will be apparent to those skilled in the art. However, such equipment is not essential to practicing the invention. To ensure an efficient and effective treatment of the mixture with the inhibitor, all that is necessary is that the hydrate inhibitor disperse through the mixture sufficiently enough to be able to interact with any water within the mixture, thus inhibiting hydrate formation. Merely introducing the hydrate inhibitor into the hydrate forming constituent and water mixture is enough to achieve the necessary amount of dispersion.

Because the inhibitor primarily serves to inhibit the formation of hydrates, rather than reverse such formation, it is important to treat the fluid prior to substantial formation of hydrates. As a wet petroleum fluid cools it will eventually reach a temperature, known as the hydrate equilibrium dissociation temperature or $T_{eq}$, below which hydrate formation is thermodynamically favored. A petroleum fluids $T_{eq}$ will shift as the pressure applied to the fluid and its composition change. Various methods of determining a fluid's $T_{eq}$ at various fluid compositions and pressures are well known to those skilled in the art. Preferably, the fluid should be treated with the inhibitor when the fluid is at a temperature greater than its $T_{eq}$. It is possible, but not preferable, to introduce the inhibitor while the temperature is at or slightly below the fluid's $T_{eq}$, preferably before clathrate hydrates have begun to form.

The quantity of hydrate inhibitor added to the hydrate forming constituent/water mixture will be an effective amount which inhibits hydrate formation. The minimum amount of inhibitor required can be determined by those skilled in the art by the well known atmospheric pressure test often referred to as the tetrahydrofuran (THF) test, taking into consideration operating conditions for actual use.

THF test typically uses 3 mL of tetrahydrofuran (THF) and 9 mL of ASTM synthetic seawater (SSW) containing the desired amount of inhibitor additive. The THF and SSW are placed in a capped test tube (15 mm OD×12.5 cm long) with a one centimeter stainless steel ball. Each tube is placed in a ferriswheel-type holder and placed in a cooling bath held near 0° C. The tubes are monitored visually and recorded with a video camera. As hydrate formation proceeds the viscosity of the THF/SSW solution increases. In many instances the solution's viscosity will become high enough for the ball to stop moving. The time required for the stainless steel ball to stop moving the full length of the tube is referred to as ball stop time or BST.

The BST is an approximate indication of an inhibitor's effectiveness. Because the THF/SSW solution has a $T_{eq}$ of about 2–5° C. and THF is miscible with water, hydrate formation is substantially accelerated for the THF/SSW solution as compared to petroleum fluids conveyed in a pipeline or flowline under typical field conditions. Therefore, BSTs are useful for indicating which inhibitors may be effective under field applications. A BST for a THF/SSW solution with an inhibitor which is about three times the BST for a THF/SSW control solution with no inhibitor present indicates that the inhibitor demonstrates a threshold inhibition effect. Therefore, as used herein, a threshold inhibition concentration ("TIC") means the inhibitor concentration in a THF/SSW solution required to produce a BST which is about three times the BST for a THF/SSW control solution. Because the THF test results are sensitive to variations in the temperature at which the test is run, rotation frequency of the tube, clearances between the stainless steel ball and tube wall, etc., it is important to run a THF/SSW control solution with each inhibitor evaluation to ensure that an inhibitor's TIC is accurately measured in that a reliable threshold inhibition effect is observed.

The maximum amount of hydrate inhibitor to be added is that amount that will result in a phase separation from or precipitation out of the hydrate forming constituent/water mixture. Preferably, the inhibitor will be added in amounts ranging from about 0.05 to 5 wt %, more preferably 0.5 to 2 wt % based on the weight of water in the mixture being acted upon.

Typically, operating conditions will be temperatures of from about 0° to about 80° F. (−17.78° C. to 26.67° C.), preferably about 32° to about 80° F. (0° C. to 26.67° C.), and pressures of from about 0° to about 10,000 psi (0 to 68,947.57 kPa), preferably about 200 to 3000 psi (1,378.95 to 20,634.27 kPa).

Ranges outside of the above ranges are contemplated so long as the hydrate inhibitor displays a threshold inhibition concentration as per the THF test at such conditions.

The instant process can be applied to any gas/water mixture where clathrate hydrates can form. For example, the process can be applied to natural gas reserves, petroleum reserves, etc. Preferably, the process will be applied to natural gas reserves. The invention is particularly useful for preventing plugging by gas clathrate-hydrates in oil and gas transmission pipelines.

Applicants, though not wishing to be bound, believe that upon addition, the inhibitors remain dispersed in solution.

Though not wishing to be bound, it is believed that the head groups adsorb to the hydrate surface, while the tails act as lubricating agents when two hydrate crystals come in contact through shear, thus inhibiting hydrate agglomeration.

Applicants have further discovered that the adduction of ethylene oxide to the alkyl chain of the tail group of the hydrate inhibitor increases the inhibitor's solubility in brines containing multivalent cations at concentrations >1000 ppm, thereby reducing possible scaling problems on pipeline surfaces and plugging of filters at separation facilities caused by such surfactants in concentrated brine solutions absent ethylene oxide adduction. Applicants believe that the adduction of ethylene oxide to possible inhibitors follows the scheme below:

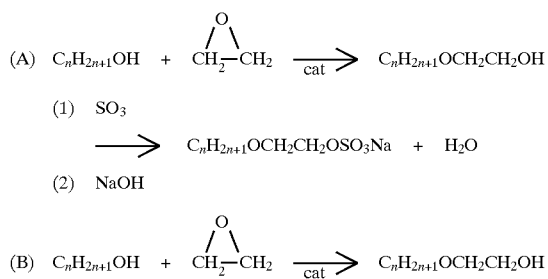

In scheme (B) a nonionic surfactant is shown which is known to form a second liquid phase as the salinity of the brine being acted upon increases. The adduction of ethylene oxide, to yield an ethoxylated alcohol, allows the inhibitor to remain dispersed in the brine and to hence be utilized in saline environments and in environments where equivalent molar amounts of multivalent cations relative to inhibitor are present. The adduction of ethylene oxide to an alkyl, alkenyls, or alkynyl chain is readily accomplished via techniques known to those skilled in the art.

As used herein, multivalent cations include cations having a valence of +2 or greater, such as calcium, magnesium, iron (+2 and +3) and mixtures thereof.

The following examples are for illustration and are not meant to be limiting.

EXAMPLES

Synthesis of $C_4$-Zwitterion

A 250 ml round bottom flask was fitted with a condenser and a nitrogen purge. N,N-dimethylbutylamine (20.0 g, 0.198 mol) and butane sultone (29.6 g, 0.218 mol) were added to 80 cc of toluene (used as received from Baker), forming a clear solution. After stirring at room temperature for 30 minutes, however, an opacity developed. The mixture was then reacted at 50° C. for 24 hours, resulting in an opaque solution and a precipitate. The reaction mixture was filtered, washed with an excess of toluene, and dried overnight in a vacuum oven at 60° C. (Yield 21 g; 48%). The product was characterized by $^1$H NMR (pertinent data are in Table 1) and was consistent with the assigned structure:

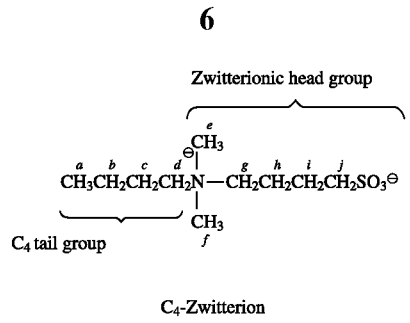

TABLE 1

| δ (ppm) | Multiplicity | # Protons | Assignment |
|---|---|---|---|
| 0.883 | triplet | 3 | a |
| 1.313 | multiplet | 2 | b |
| 1.667 | multiplet | 2 | c |
| 1.734 | multiplet | 2 | i |
| 1.857 | multiplet | 2 | h |
| 2.899 | triplet | 2 | j |
| 2.985 | singlet | 6 | e and f |
| 3.237 | 2 multiplets | 4 | d and g |

NMR Characterization data for $C_4$-Zwitterion

The product is readily soluble in both fresh water and brine.

This synthesis procedure was used to produce water-soluble materials of varied alkyl chain lengths. The amines used in conjunction with butane sultone include:

N,N-dimethylhexylamine

N,N-dimethyldodecylamine

N,N-dimethyloctylamine

Example 2

Performance Testing-Control Sample

Natural gas hydrates occur only at high pressures not readily accessible under normal laboratory conditions. It is known in the art that tetrahydrofuran (THF) hydrates are good model systems for natural gas hydrates. These hydrates form at 4° C. (atmospheric pressure) at a water:THF molar ratio of 17:1. Thus, if additives function successfully to kinetically inhibit the formation of THF hydrates, then they should perform similarly on gas hydrates. Furthermore, if viscosities of the THF/hydrate slurries are low at 0° C., then they should be pumpable in most of the production, transport, and processing conditions found in the field.

In order to test the effectiveness of these hydrate inhibitors, we made the hydrates up both with and without inhibitors. The viscosities of these slurries were measured with a Brookfield viscometer fitted with a Heliopath spindle. In a control experiment (i.e. one in which no inhibitor was added), 25 cc THF was added at room temperature to 75 cc of brine solution, producing a 13:1 molar ratio water:THF mixture. (The brine is a standard ASTM solution.) This ratio was used to ensure that all of the water was used to make hydrate and that no water was consumed as ice. The solution was stirred for approximately 20 minutes. It was then loaded into a water-jacketed cell containing a magnetic stir bar. The cell was cooled to 0° C. with mild stirring. (At this point, the solution was supercooled). Upon cooling, there was a noticeable turbidity. Once at 0° C., the system was "shocked" into hydrate formation by rapid stirring. Immediately, hydrate formed, with a characteristic temperature rise of a few 0° C. After about an hour, the magnetic stirrer could no longer stir the slurry. Attempts to measure the viscosity with the Brookfield viscometer failed because the viscosity was so high.

Example 3

Performance Testing-Effect of Inhibitors

The effect of the inhibitors is demonstrated by this example.

25 cc THF was added in a similar manner as described in Example 2 to 75 cc of brine, however, the brine contained 2 g (0.0161 mol) sodium valerate. The hydrate was formed as described in Example 2. This time, however, an hour after the hydrate formed, a slurry resulted from which a viscosity measurement was made. Thus, viscosity measured at 0° C. on a Brookfield viscometer equipped with a Heliopath Spindle (Spindle TD) was 15,171 cps. This demonstrates that addition of the sodium valerate significantly reduced the viscosity of the hydrate slurry, since it was so high that it couldn't be measured when no inhibitor was added.

The other inhibitors tested, n-Butanol, $C_4$-Zwitterion and 1-butanesulfonic acid, Na salt, produced hydrates with similarly low viscosities. They were each dosed at 0.0161 moles per 75 cc of brine. The results of these measurements are shown in FIG. 1. From the values for the viscosity it has been demonstrated that the hydrates formed in the presence of these inhibitors have low enough viscosities to be pumped.

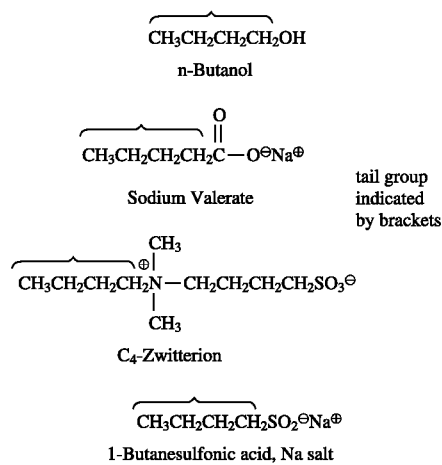

tail group indicated by brackets

Example 4

Effect of Tail Chain Length

This example will demonstrate that as the "tail length" of these inhibitors increases, they do not perform as effectively.

The experiments described in Example 3 were carried out on a series of the zwitterionic inhibitors of increasing tail length. The results are tabulated below in Table 2.

It is evident that the viscosities of the hydrate formed increase as a function of the tail length and the cut-off for carbon chain length is somewhere between 8 and 11 carbons for a zwitterionic inhibitor. The example below will demonstrate a 12 carbon inhibitor that performs well.

Example 5

Performance Testing Inhibitors in Bench Test Atmospheric Pressure Test

The inhibitors can also be evaluated in a bench-scale atmospheric pressure test. 3 ml of tetrahydrofuran (THF) and 9 ml ASTM synthetic sea water containing the desired amount of inhibitor are placed in a capped test tube (15 mm OD×12.5 cm long) with a ⅜" stainless steel ball. The tubes are placed in a ferris-wheel-type holder and placed in a cooling bath held at 0° C. The tubes are rotated to facilitate mixing of the samples. The tubes are monitored visually and recorded with a video camera. The time required for the stainless steel ball to stop moving due to hydrate crystal formation is measured as an indication of inhibitor activity. The longer it takes to ball to stop, the better the inhibitor

TABLE 2

THF Hydrate Viscosity as a Function of Additive Tail Length $$CH_3(CH_2)_n{}^+\!N(CH_3)(CH_3)-CH_2CH_2CH_2CH_2SO_3{}^-$$

| n= | Viscosity (cps) |
|---|---|
| 3 | 12,584 |
| 5 | 21,580 |
| 7 | 46,426 |
| 11 | too high to measure |

The efficacy of two alkylpyrrolidone surfactants (structures shown below) is demonstrated in Table 3 below. For these experiments, a small amount of sodium dodecylsulfate (SDS, 10% of the alkylpyrroli-done loading) was added to help solubilize the additives in water.

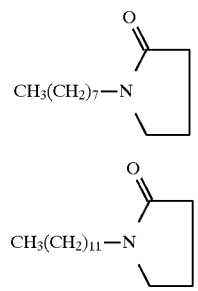

TABLE 3

Performance of Additives in Bench Test Atmospheric Pressure Test

| Additive | Concentration (wt %) | Ball Stop Time (minutes) |
|---|---|---|
| None | — | 10 |
| LP 100 | 0.25 | 49 |
| LP 300 | 0.5 | 109 |

Example 6

This example demonstrates the change in plugging temperatures as a result of concentration for butyl sulfate performed in a test loop using methane and water.

| Run ID | Butyl Sulfate (wt %) | Onset Temperature (°F.) | Plugging Temperature (°F.) |
|---|---|---|---|
| I/J | 0.00 | 57.5 | 57.5 |
| K/L | 0.10 | 56.4 | 56.4 |
| N/N | 0.25 | 56.2 | <37 |

The Hydrate Mini-Loop is characterized by piping connected in the form of a continuous loop 10 feet long and 0.5 inch in diameter. The loop is submersed in a temperature-controlled water bath. Before starting an experiment, the loop is charged with a standard mixture of gaseous hydrocarbons, condensate, and a synthetic sea water solution. The loop contents are circulated by a pump operated at a fixed speed. An accumulator, with a sliding piston dividing the gaseous loop contents from hydraulic oil, is utilized for maintaining pressure. The pressure is kept constant via a process control program. The program also dictates the temperature cycle for cooling the loop to hydrate-formation temperatures, and re-heating to assure complete hydrate dissociation between cycles. The onset temperature is the point at which hydrate formation is first observed, characterized by a sudden uptake in the gaseous hydrocarbons/hydraulic oil. The plugging temperature is the point at which a significant increase in delta pressure is observed across the pump.

What is claimed is:

1. A composition comprising a mixture of hydrate forming constituents, water, and a hydrate inhibitor having a polar head group directly connected to a non polar tail group wherein the hydrate inhibitor is selected from the group consisting of sodium valerate, sodium salt of 1-butanesulfonic acid, and a zwitterion having the formula

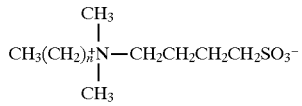

wherein n ranges from 3 to 7.

2. A composition according to claim 1 wherein ethylene oxide is adducted to said tail group of said inhibitor.

* * * * *